US011836414B2

(12) United States Patent
Iyer et al.

(10) Patent No.: US 11,836,414 B2
(45) Date of Patent: Dec. 5, 2023

(54) MANAGING AUDIO DEVICES OF AN INFORMATION HANDLING SYSTEM

(71) Applicant: Dell Products L.P., Round Rock, TX (US)

(72) Inventors: Vivek Viswanathan Iyer, Austin, TX (US); Chia-Hung Shih, Taipei (TW)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 17/355,794

(22) Filed: Jun. 23, 2021

(65) Prior Publication Data

US 2022/0413792 A1 Dec. 29, 2022

(51) Int. Cl.
*G06F 17/00* (2019.01)
*G06F 3/16* (2006.01)
*G06F 1/16* (2006.01)
*G06F 11/30* (2006.01)

(52) U.S. Cl.
CPC ............ *G06F 3/162* (2013.01); *G06F 1/1632* (2013.01); *G06F 3/165* (2013.01); *G06F 11/3041* (2013.01); *G06F 2201/86* (2013.01)

(58) Field of Classification Search
CPC ........ G06F 1/1632; G06F 3/162; G06F 3/165; G06F 11/3041; G06F 11/3055; G06F 2201/86
USPC .......................................................... 700/94
See application file for complete search history.

(56) References Cited

U.S. PATENT DOCUMENTS

2006/0248173 A1* 11/2006 Shimizu ................. H04H 60/04
709/220

OTHER PUBLICATIONS

Yamaha DME designer; Version 3.8 (Year: 2010).*
Hanselman, Scott. "Using Home Assistant to integrate a Unifi Protect G4 Doorbell and Amazon Alexa to announce visitors", https://www.hanselman.com/blog/using-home-assistant-to-integrate-a-unifi-protect-g4-doorbell-and-amazon-alexa-to-announce-visitors, Dec. 14, 2021.
IMMNotificationClient (mmdeviceapi.h)—Win32 apps | Microsoft Docs https://docs.microsoft.com/en-us/windows/win32/api/mmdeviceapi/nn-mmdeviceapi-immnotificationclient, Jul. 22, 2021.

(Continued)

*Primary Examiner* — Paul C McCord
(74) *Attorney, Agent, or Firm* — McDermott Will & Emery LLP

(57) ABSTRACT

Managing audio devices of an information handling system (IHS), including: performing initialization of audio-scenario database table, including: configuring, for audio scenarios at an IHS, an associated audio device, each audio device associated with an audio ID that uniquely identifies the audio device; generating the audio-scenario database table that indicates, for each audio scenario, an associated audio device ID of the audio device for the audio scenario; performing a steady-state monitoring of the IHS, including: identifying an initialization of a particular audio scenario, and in response, identifying active audio devices with respect to the IHS; comparing the audio ID of each of the active audio devices with the audio-scenario database table; matching, based on the comparing, a particular audio ID of a particular active audio device of the active audio devices with the audio-scenario database table; enabling, based on the matching, the particular active audio device for the particular audio scenario.

18 Claims, 5 Drawing Sheets

(56) References Cited

OTHER PUBLICATIONS

About MMDevice API—Win32 apps | Microsoft Docs, htttps://docs.microsoft.com/en-us/windows/win32/coreaudio/mmdevice-api?redirectedfrom=MSDN, Jan. 6, 2021.
IMMDeviceEnumerator—EnumAudioEndpoints (mmdeviceapi.h)—Win32 apps | Microsoft Docs, https://docs.microsoft.com/en-us/windows/win32/api/mmdeviceapi/nf-mmdeviceapi-immdeviceenumerator-enumaudioendpoints, Oct. 13, 2021.
IMMDeviceCollection—Item (mmdeviceapi.h)—Win32 apps | Microsoft Docs, https://docs.microsoft.com/en-us/windows/win32/api/mmdeviceapi/nf-mmdeviceapi-immdevicecollection-item, Oct. 13, 2021.
IMMDeviceEnumerator—GetDevice (mmdeviceapi.h)—Win32 apps | Microsoft Docs, https://docs.microsoft.com/en-us/windows/win32/api/mmdeviceapi/nf-mmdeviceapi-immdeviceenumerator-getdevice, Oct. 13, 2021.
CodeMachine—Article—How Windows Sets the Default Audio Device https://codemachine.com/articles/how_windows_sets_default_audio_device.html, Jan. 7, 2022.

* cited by examiner

MANAGING AUDIO DEVICES OF AN INFORMATION HANDLING SYSTEM

BACKGROUND

Field of the Disclosure

The disclosure relates generally to an information handling system, and in particular, managing audio devices of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there is no avenue for a user to have his/her preferred audio device settings configured without manual intervention.

SUMMARY

Innovative aspects of the subject matter described in this specification may be embodied in a method of managing audio devices of an information handling system, the method including performing, at a first time, initialization of an audio-scenario database table, including: configuring, for one or more audio scenarios at an information handling system, an associated audio device, each audio device associated with an audio device identification (ID) that uniquely identifies the audio device; generating the audio-scenario database table that indicates, for each audio scenario, an associated audio device ID of the audio device for the audio scenario; performing, at a second time, a steady-state monitoring of the information handling system, including: identifying an initialization of a particular audio scenario; in response to identifying the initialization of the particular audio scenario, identifying one or more active audio devices with respect to the information handling system; comparing the audio ID of each of the one or more active audio devices with the audio-scenario database table; matching, based on the comparing, a particular audio ID of a particular active audio device of the one or more active audio devices with the audio-scenario database table; and enabling, based on the matching, the particular active audio device for the particular audio scenario.

Other embodiments of these aspects include corresponding systems, apparatus, and computer programs, configured to perform the actions of the methods, encoded on computer storage devices.

These and other embodiments may each optionally include one or more of the following features. For instance, identifying the audio scenarios, including, for each audio scenario: identifying a computer-implemented application associated with the audio scenario; identifying one or more processes of the computer-implemented application that is associated with the audio scenario; identifying one or more parameters associated with the computer-implemented application and the one or more processes, the parameters including one or more of day, time, meeting type, type of the computer-implemented application, posture mode of the information handling system, hinge angle of the information handling system, and docking mode. Storing the audio-scenario database table. Registering for notifications regarding event status changes of the one or more audio devices with respect to the information handling system, the event status changes including coupling and/or decoupling of the one or more audio devices with respect to the information handling system. Identifying the one or more active audio devices with respect to the information handling system includes identifying the one or more active audio devices with respect to the information handling system based on the event status changes of the one or more active audio devices. Performing image recognition of a video feed to identify a specific audio device of a user associated with the information handling system within the video feed, wherein enabling further includes enabling the specific audio device as the particular active audio device for the particular audio scenario. Disabling, based on the matching, a different audio device for the particular audio scenario, the different audio device previously enabled with respect to the information handling system. The particular audio scenario is associated with a workspace of the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
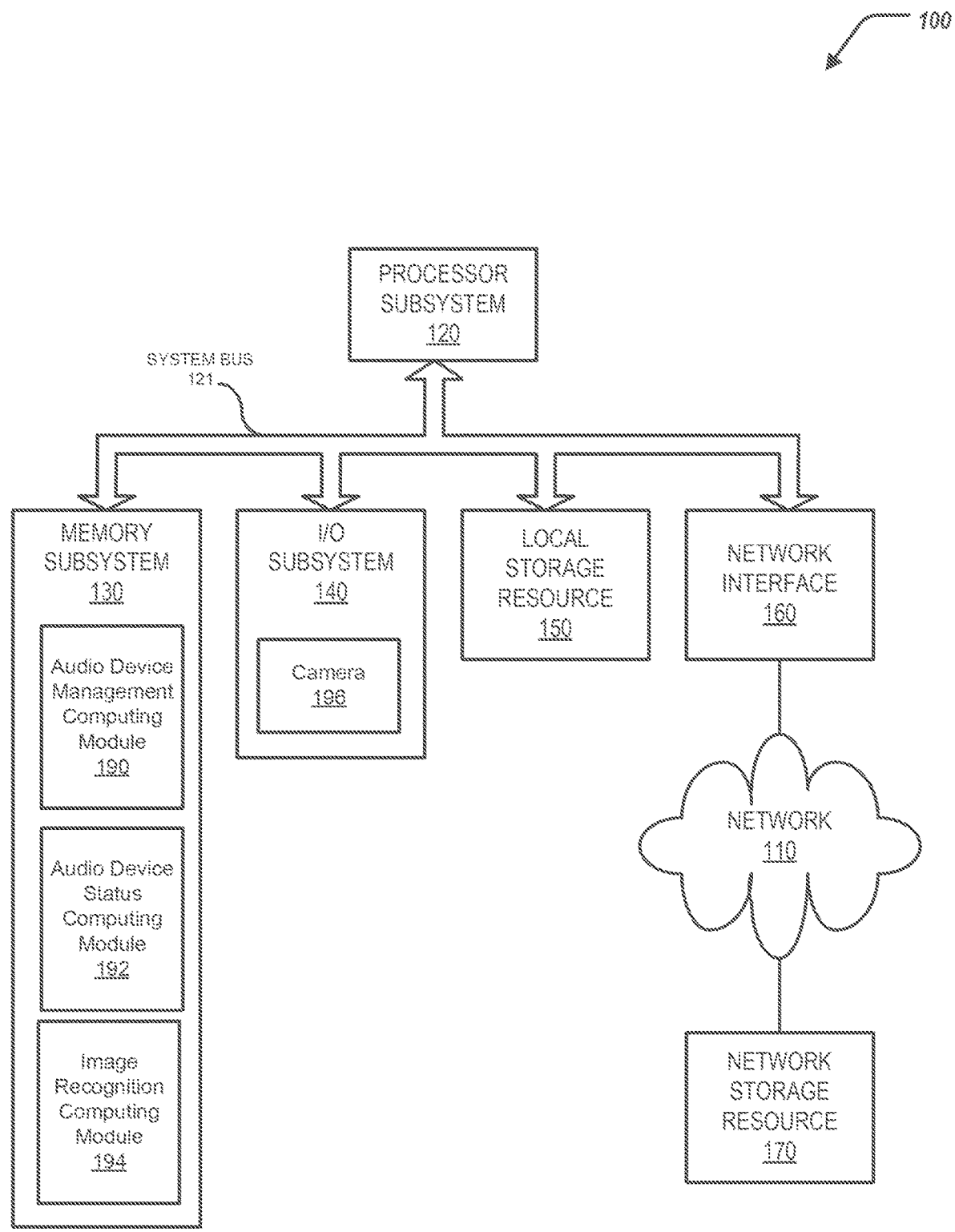
FIG. 1 is a block diagram of selected elements of an embodiment of an information handling system.

This disclosure discusses methods and systems for managing audio devices of an information handling system. In short, the disclosure discusses facilitating audio device configurations for an information handling system. For example, based on particular parameters, applications that are executing, and processes within those applications, a user of the information handling system may prefer a particular audio device over another. Such preferences can be stored in a database, such that at a later time, activation of the audio device is performed without user interaction.

Specifically, this disclosure discusses a system and a method for managing audio devices of an information handling system, including performing, at a first time, initialization of an audio-scenario database table, including: configuring, for one or more audio scenarios at an information handling system, an associated audio device, each audio device associated with an audio device identification (ID) that uniquely identifies the audio device; generating the audio-scenario database table that indicates, for each audio scenario, an associated audio device ID of the audio device for the audio scenario; performing, at a second time, a steady-state monitoring of the information handling system, including: identifying an initialization of a particular audio scenario; in response to identifying the initialization of the particular audio scenario, identifying one or more active audio devices with respect to the information handling system; comparing the audio ID of each of the one or more active audio devices with the audio-scenario database table; matching, based on the comparing, a particular audio ID of a particular active audio device of the one or more active audio devices with the audio-scenario database table; and enabling, based on the matching, the particular active audio device for the particular audio scenario.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. In some examples, the I/O subsystem 140 can further include a camera 196.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an audio device management computing module 190. The audio device management computing module 190 can be included by the memory subsystem 130. The audio device management computing module 190 can include a computer-executable program (software). The audio device management computing module 190 can be executed by the processor subsystem 120.

The information handling system 100 can also include an audio device status computing module 192. The audio device status computing module 192 can be included by the memory subsystem 130. The audio device status computing module 192 can include a computer-executable program (software). The audio device status computing module 192 can be executed by the processor subsystem 120.

The information handling system 100 can also include an image recognition computing module 194. The image recognition computing module 194 can be included by the memory subsystem 130. The image recognition computing module 194 can include a computer-executable program (software). The image recognition computing module 194 can be executed by the processor subsystem 120.

In short, the audio device management computing module 204 can facilitate audio device configurations for the information handling system 100. For example, based on particular parameters, applications that are executing, and processes within those applications, a user of the information handling system 100 may prefer a particular audio device over another. The audio device management computing module 190 can store such associations in a database, such that at a later time, activation of the audio device is performed without user interaction.

Figure 2:
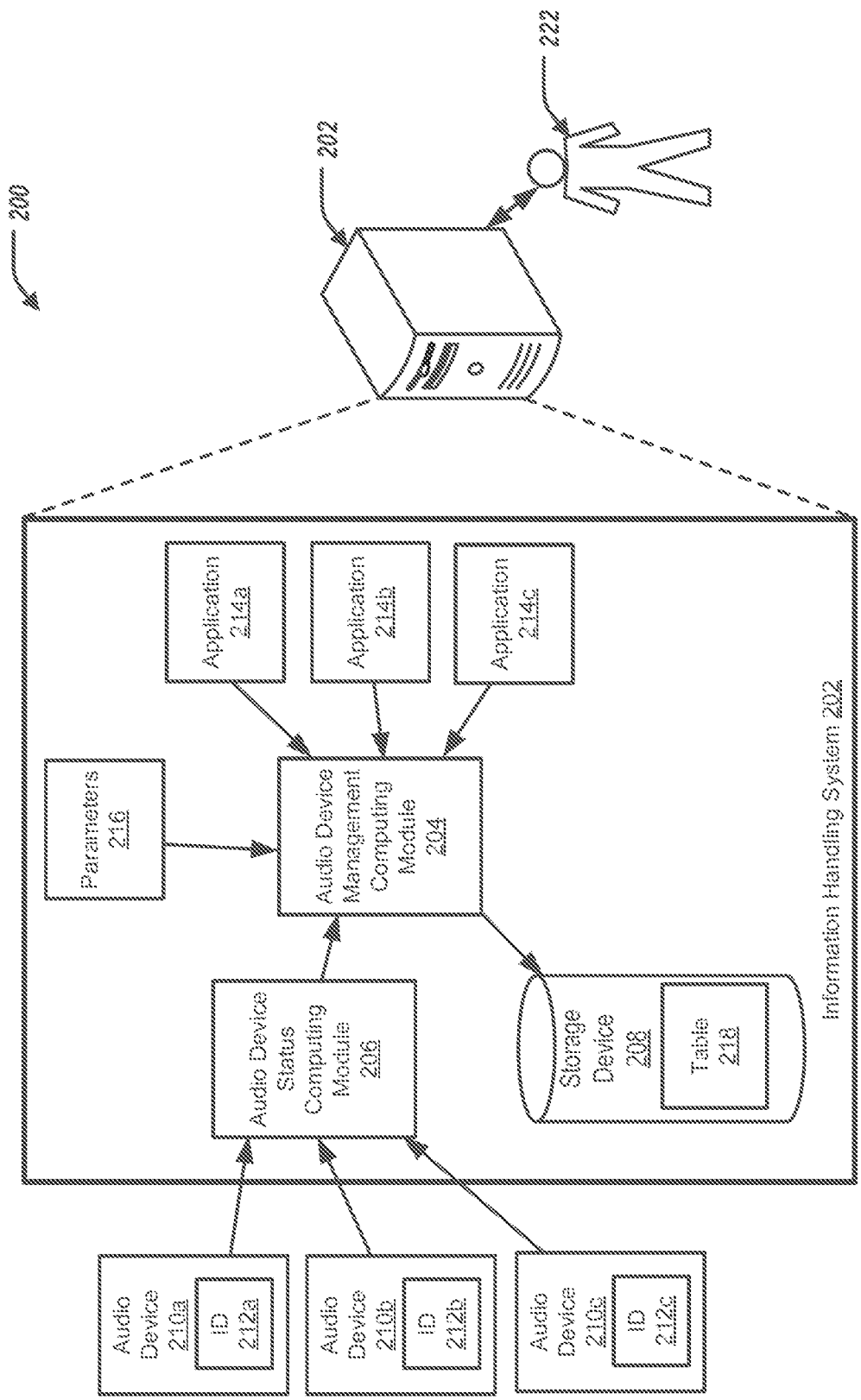
FIGS. 2-4 illustrate respective block diagrams of an information handling system for managing audio devices of the information handling system.

Turning to FIG. 2, FIG. 2 illustrates an environment 200 including an information handling system 202. The information handling system 202 can include an audio device management computing module 204, an audio device status computing module 206, and a storage device 208. In some examples, the information handling system 202 is similar to, or includes, the information handling system 100 of FIG. 1. In some examples, the audio device management computing module 204 is the same, or substantially the same, as the audio device management computing module 190 of FIG. 1. In some examples, the audio device status computing module 206 is the same, or substantially the same, as the audio device status computing module 192 of FIG. 1.

The environment 200 can further include audio devices 210a, 210b, 210c (collectively referred to as audio devices 210). One or more of the devices 210 can be in communication with the information handling system 202 (that is, one or more of the devices 210 can be coupled with or decoupled from the information handling system 202 at a time). For example, the audio devices 210 can include headphones with microphone, speakers with or without microphone, headset, or similar. The audio device 210a can be associated with an audio device identification (ID) 212a that uniquely identifies the audio device 210a; the audio device 210b can be associated with an audio device identification (ID) 212b that uniquely identifies the audio device 210b; and the audio device 210c can be associated with an audio device identification (ID) 212c that uniquely identifies the audio device 210c. In some examples, audio IDs 212a, 212b, 212c (collectively referred to as audio IDs 212) are assigned by the information handling system 202, and specific for the information handling system 202. In some examples, the audio IDs 212 are independent of the information handling system 202.

A user 222 can be associated with the information handling system 202, and/or the audio devices 210. That is, the user 222 can use, or implement, the information handling system 202 and/or the audio devices 210.

The audio device management computing module 204 can perform, at a first time, initialization of an audio-scenario database table. Specifically, the audio device management computing module 204 can configure, for audio scenarios of the information handling system 202, an associated audio device 210. In particular, the audio device management computing module 204 can identify one or more computer-implemented applications 214a, 214b, 214c (collectively referred to as computer-implemented applications 214) that is executable (or executing) by the information handling system (e.g., the processor subsystem 120). For each audio scenario, the audio device management computing module 204 can identify one of the applications 214 for the audio scenario (e.g., the application 214 that is currently executing). For example, the applications 214 can include video playback applications, and/or video conferencing applications. The audio device management computing module 204 can further identify, for each audio scenario, one or more processes that are associated with the audio scenario (the processes implemented by the application 214). For example, the processes can include video playback, audio input, audio output, etc.

The audio device management computing module 204 can further identify the audio scenarios by identifying the audio processes by identifying, for each application 214, parameters 216 associated with the application 214, and/or the processes of the application 214. The parameters 216 can further be associated with the information handling system 202. In some examples, the parameters 216 can include a time and day associated with the process and/or execution of the application 214. In some examples, the parameters 216 can include a type of the application 214 (e.g., video playback application or video conferencing application). In some examples, the parameters 216 can include a posture mode of the information handling system 202 (when the information handling system 202 includes a two-body or dual-body arrangement)—e.g., table top posture mode, book posture mode, tent posture mode. In some examples, the parameters 216 can include a hinge angle of the information handling system 202 (when the information handling system 202 includes a two-body or dual-body arrangement)—e.g., an angle between each of the bodies of the information handling system 202. In some examples, the parameters 216 can include a docking mode of the information handling system 202—e.g., whether the information handling system 202 is coupled to a docking station (not shown), or a type of docking station the information handling system 202 is coupled to. In some examples, when the application 214 includes a video conferencing application, the parameters 216 can relate to a meeting type currently engaged with the video conferencing application (e.g., formal or informal meeting, persons attending the meeting, etc.).

In short, the audio processes can be defined by the applications 214, the processes of the applications 214, and/or the parameters 216. Each of the audio processes can be associated with one or more of the audio devices 210.

In furtherance of initialization of the audio-scenario database table, the audio device status computing module 206 can identify the audio devices 210 for the audio scenario. Specifically, the audio device status computing module 206 can be in communication with each of the audio devices 210. For each audio scenario, the audio device status computing module 206 can identify the audio device 210 that is configured for the audio scenario, and provide a signal/data to the audio device management computing module 204 indicating such. In some examples, the audio device 210 is configured for a particular audio scenario based on user input, or an active status of the audio device 210 with respect to the information handling system 202.

The audio device management computing module 204 can generate an audio-scenario database table 218 that is stored by the storage device 208. The audio-scenario database table 218 can store, for each audio scenario, an associated audio device ID 212 of the audio device 210 for the audio scenario. That is, the audio device management computing module 204 can store the corresponding ID 212 (or IDs 212) of the audio devices 210 that are configured for each audio scenario. In some examples, the table 218 is stored locally, e.g., at the storage device 208. In some examples, the table 218 is stored at a back-end storage device, e.g., a storage device connected to the information handling system 202 over a network.

Figure 3:
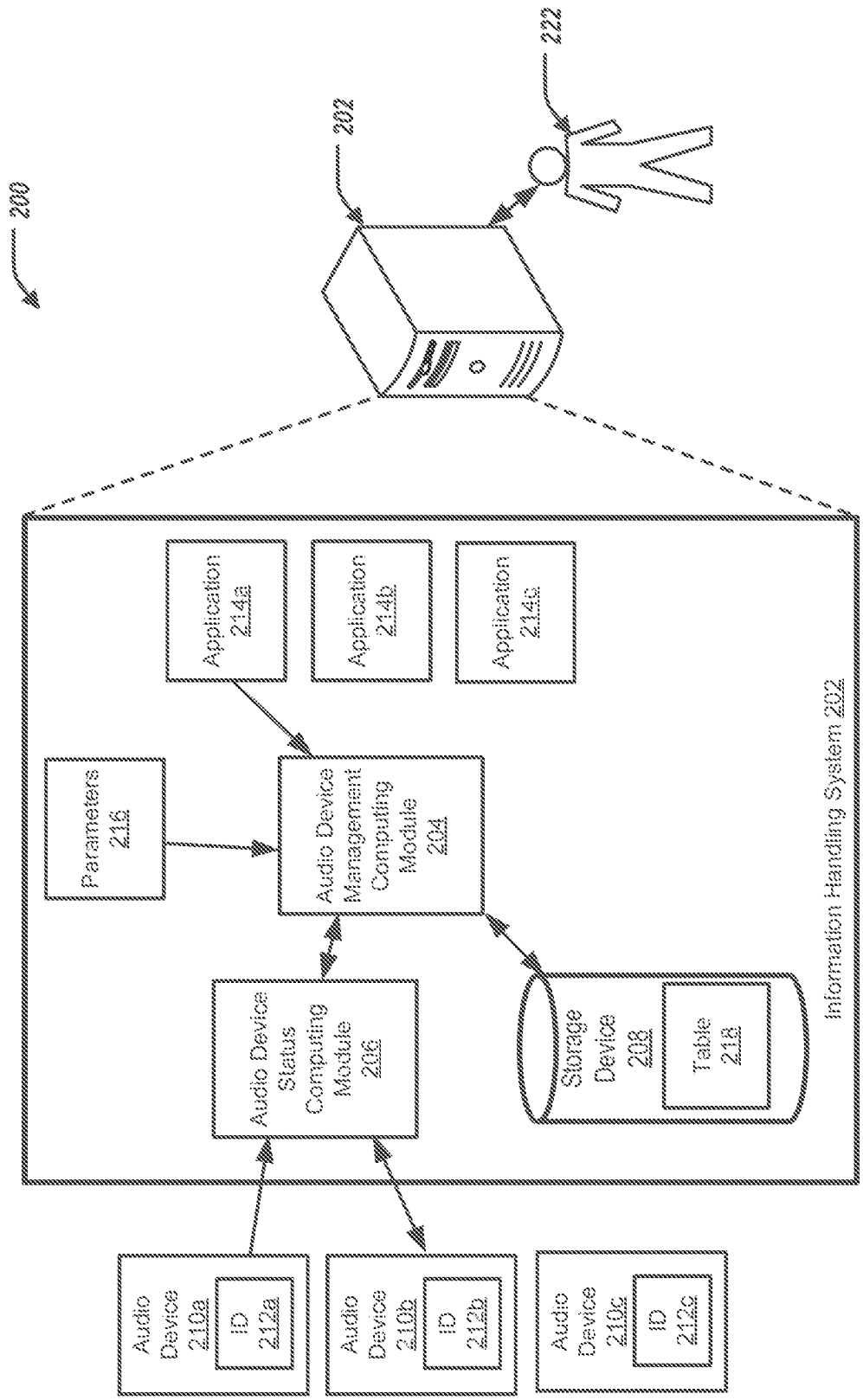

FIG. 3 illustrates the environment 200 when performing, at a second time, steady-state monitoring of the information handling system 202. Specifically, steady state monitoring of the information handling system 202 can include the audio device management computing module 204 registering for notifications regarding event status changes of the audio devices 210 with respect to the information handling system 202. The audio device status computing module 206 can determine a status of each of the audio devices 210 with respect to the information handling system 202—that is, whether each of the audio devices 210 is, respectfully, coupled or decoupled (plugged or unplugged) with respect to the information handling system 202.

As illustrated, the audio devices 210a, 210b are coupled to the information handling system 202. Thus, the audio device status computing module 206 can determine a status change of the audio device 210c with respect to the information handling system 202 (decoupling or unplugging), and provide such information to the audio device management computing module 204. That is, the audio device management computing module 204 registers with the audio device status computing module 206 for notification of event status changes of the audio devices 210 (coupling or decoupling) with respect to the information handling system 202.

The audio device management computing module 204 can further, during the steady-state monitoring, identify an initialization of a particular audio scenario. Specifically, the audio device management computing module 204 can identify initial execution of an application 214, implementation of a process by the application 214, and/or parameters 216 associated with the initial execution of the application 214. In the illustrated example, the audio device management computing module 204 can identify initialization of an audio scenario that includes execution of the application 214a.

In some examples, identifying the initialization of the particular audio scenario can include identifying execution of a particular application 214, a particular process implemented by the particular application 214, and a particular combination of parameters 216.

The audio device management computing module 204, in response to identifying the initialization of the particular audio scenario of the information handling system 202, can identify one or more of the audio devices 210 that are active with respect to the information handling system 202. Specifically, the audio device management computing module 204 can identify which of the audio devices 210 is active based on the event status changes of the audio devices 210. The audio device management computing module 204 can monitor a list of audio devices 210 that are active that is provided by the audio device status computing module 206. As illustrated, the audio devices 210a and 210b are both active with respect to the information handling system 202. That is, each of the audio devices 210a and 210b are present and not disabled with respect to the information handling system 202.

The audio device management computing module 204 can compare the audio IDs 212 of each of the active audio devices 210 with the audio-scenario database table 218. That is, the audio device management computing module can compare the audio IDs 212 of each of the active audio devices 210 with the audio IDs that are stored by the table 218. In the illustrated example, the audio device management computing module 204 can compare the audio IDs 212a, 212b with the audio IDs stored by the table 218.

The audio device management computing module can match, based on the comparing, a particular audio ID 212 of a particular audio device 210 with the table 218 for the identified audio scenario. In the illustrated example, the audio device management computing module 204 can match the audio ID 212b of the audio device 210b with the table 218 for the identified audio scenario.

The audio device management computing module can enable, based on the matching, the particular active audio device 210b for the particular audio scenario. That is, the audio endpoint of the information handling system 202 is switched to the audio device 210b. In some examples, the audio device management computing module can further disable, based on the matching, the audio device 210a for the particular audio scenario, wherein the audio device 210a was previously enabled with respect to the information handling system. That is, the audio endpoint of the information handling system 202 is switched from the audio device 210a to the audio device 210b.

Figure 4:
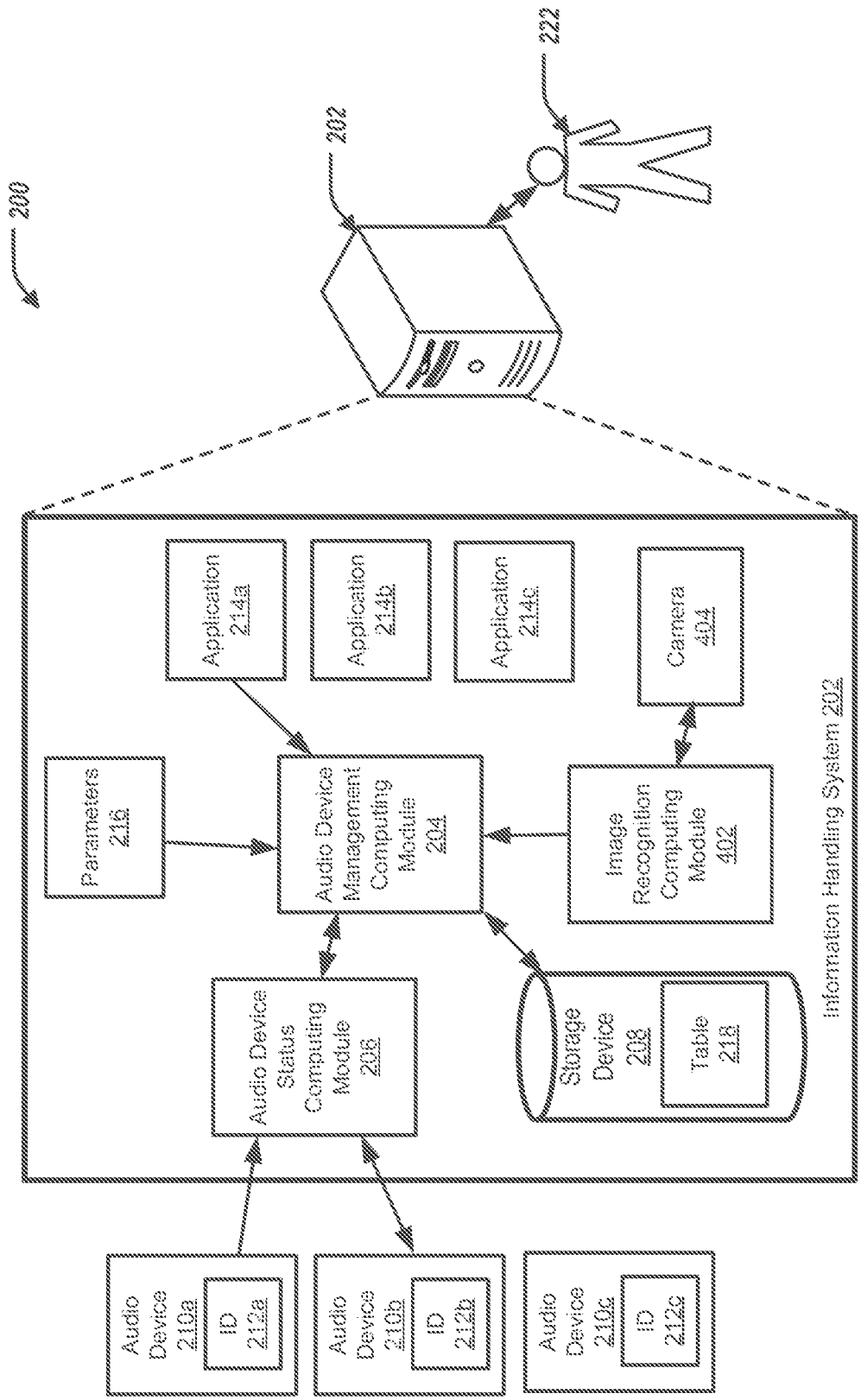

FIG. 4 illustrates the environment 200 in a further implementation. Specifically, the information handling system 202 can further include an image recognition computing module 402 and a camera 404. In some examples, the image recognition computing module 402 is the same, or substantially the same, as the image recognition computing module 194 of FIG. 1. In some examples, the camera 404 is the same, or substantially the same, as the camera 196 of FIG. 1. The image recognition computing module 402 can be in communication with the audio device management computing module 204 and the camera 404.

The camera 404 can obtain a video feed of the environment 200, and specifically, of the user 222. The video feed can capture an image (or video) of an audio device 210 that is currently being used by the user 222. For example, the user 222 can be using a headset as the audio device 210, and the camera 404 can obtain an image (or video) of the user 222 using (wearing) the audio device 210. The image recognition computing module 402 can access the video feed provided by the camera 404 and perform image recognition on one or more images (or videos) of the camera 404. In particular, the image recognition computing module 402 can identify the headset of the user 222 as the audio device 210. The audio device management computing module 204 can enable the audio device 210 that is image recognized by the audio device management computing module 204 as the active audio device for the identified audio scenario.

Referring back to FIG. 2, in some examples, when the table 218 is stored at a back-end storage device, the table 218 can store audio scenarios and associated audio device IDs for multiple information handling systems (e.g., similar to the information handling system 202).

In some examples, the audio scenarios can be associated with workspaces (or containers) of the information handling system 202.

In a first use case example, the user 222 is primarily working from home (WFH), and attends a videoconference using a videoconference application 214a. When the user 222 utilizes the videoconference application 214a in the evening hours, the user 222 primarily utilizes the audio device 210a— a headset. The audio device management computing module 204 can update the table 218 to indicate that when the audio scenario of execution of the application 214a, and the evening hours, to associate the ID 212a with such a scenario.

In a second use case example, the user 222 is watching a video playback application 214b. When the user 222 utilizes video playback application 214b, the information handling system 202 is in a tent-posture mode, and utilizes the audio device 210b— external speakers. The audio device management computing module 204 can update the table 218 to indicate that when the audio scenario of execution of the application 214b, and the tent-posture mode, to associate the ID 212b with such a scenario.

Figure 5:
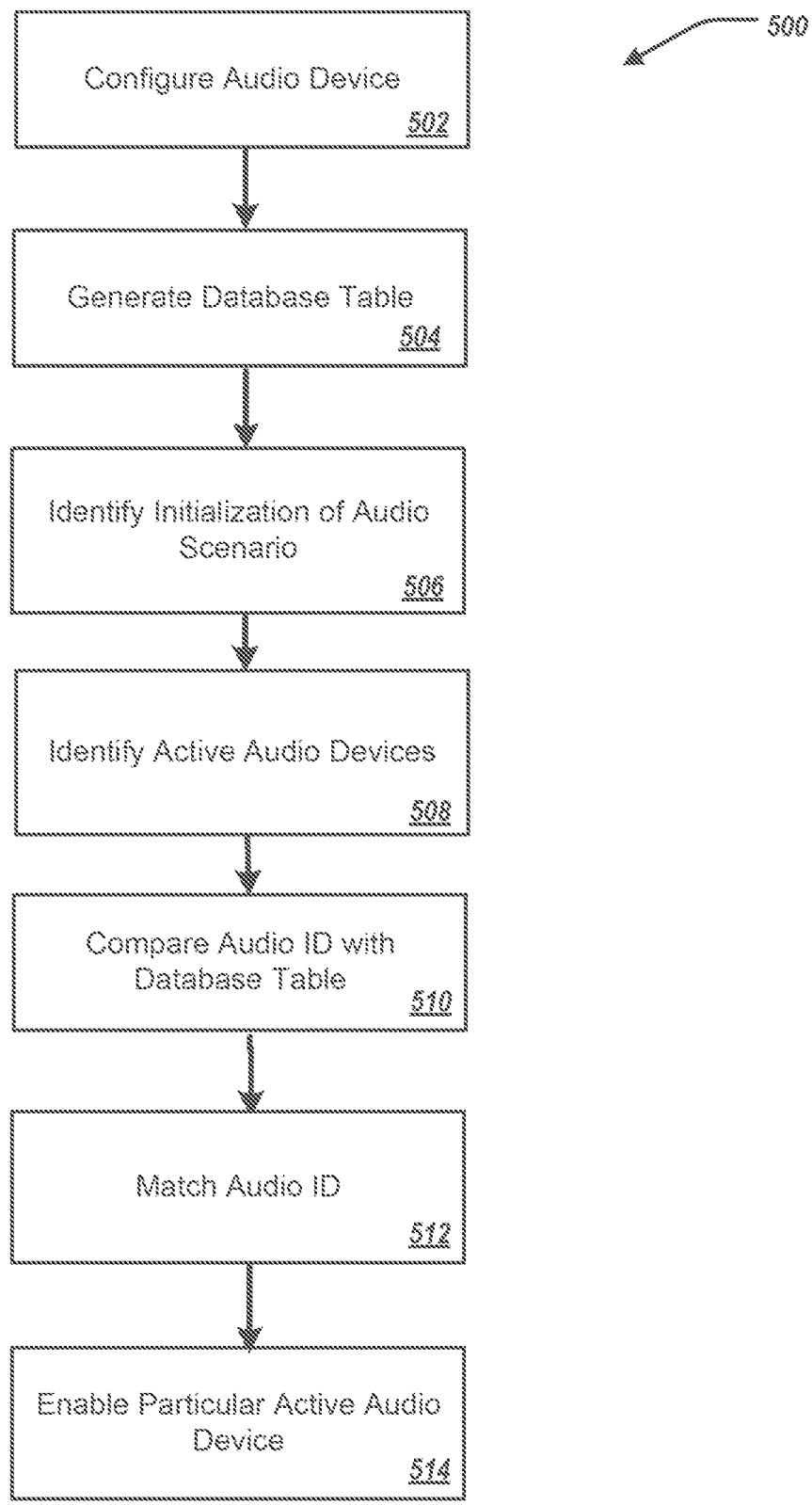
FIG. 5 illustrates a method for managing audio devices of the information handling system.

FIG. 5 illustrates a flowchart depicting selected elements of an embodiment of a method 500 for managing audio devices of an information handling system. The method 500 may be performed by the information handling system 100, the information handling system 202, the audio device management computing module 204, and/or the audio device status computing module 206, the image recognition computing module 402 and with reference to FIGS. 1-4. It is noted that certain operations described in method 500 may be optional or may be rearranged in different embodiments.

The audio device management computing module 204 can configure, for one or more audio scenarios at the information handling system 202, an associated audio device 210 (502). In some examples, each audio device 210 is associated with an audio device identification (ID) 212 that uniquely identifies the audio device 210. The audio device management computing module 204 can generate the audio-scenario database table 218 that indicates, for each audio scenario, an associated audio device ID 212 of the audio device 210 for the audio scenario (504). The audio device management computing module 204 can identify an initialization of a particular audio scenario (506). The audio device management computing module 204 can, in response to identifying the initialization of the particular audio scenario, identifying one or more active audio devices 210 with respect to the information handling system 202 (508). The audio device management computing module 204 can compare the audio ID 212 of each of the one or more active audio devices 210 with the audio-scenario database table 218 (510). The audio device management computing module 204 can match, based on the comparing, a particular audio ID 212 of a particular active audio device 210 of the one or more active audio devices 210 with the audio-scenario database table 218 (512). The audio device management computing module 204 can enable, based on the matching, the particular active audio device 210 for the particular audio scenario (514).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for managing audio devices of an information handling system, the method comprising:
    performing, at a first time, initialization of an audio-scenario database table, including:
        configuring, for one or more audio scenarios at an information handling system, an associated audio device, each audio device associated with an audio device identification (ID) that uniquely identifies the audio device;
        generating the audio-scenario database table that indicates, for each audio scenario, an associated audio device ID of the audio device for the audio scenario;
    performing, at a second time, a steady-state monitoring of the information handling system, including:
        identifying an initialization of a particular audio scenario;
        in response to identifying the initialization of the particular audio scenario:
            obtaining an image of a user of the information handling system during the initialization of the particular audio scenario;
            performing image recognition of the image;
            identifying, in response to the image recognition of the image, a particular audio device within the image;
        comparing the audio ID of the particular audio device with the audio-scenario database table;
        matching, based on the comparing, a particular audio ID of the particular audio device with the audio-scenario database table; and
        enabling, based on the matching, the particular audio device as the active audio device for the particular audio scenario.

2. The computer-implemented method of claim 1, further comprising:
    identifying the audio scenarios, including, for each audio scenario:
        identifying a computer-implemented application associated with the audio scenario;
        identifying one or more processes of the computer-implemented application that is associated with the audio scenario;
        identifying one or more parameters associated with the computer-implemented application and the one or more processes, the parameters including one or more of day, time, meeting type, type of the computer-implemented application, posture mode of the information handling system, hinge angle of the information handling system, and docking mode.

3. The computer-implemented method of claim 1, further comprising storing the audio-scenario database table.

4. The computer-implemented method of claim 1, further comprising:
    registering for notifications regarding event status changes of the one or more audio devices with respect to the information handling system, the event status changes including coupling and/or decoupling of the one or more audio devices with respect to the information handling system.

5. The computer-implemented method of claim 4, further comprising:
    determining that the particular audio device of the image is coupled or decoupled with respect to the information handling system based on the event status changes of the particular audio device.

6. The computer-implemented method of claim 1, further comprising:
    disabling, based on the matching, a different audio device for the particular audio scenario, the different audio device previously enabled with respect to the information handling system.

7. The computer-implemented method of claim 1, wherein the particular audio scenario is associated with a workspace of the information handling system.

8. An information handling system comprising a processor having access to memory media storing instructions executable by the processor to perform operations, comprising:
    performing, at a first time, initialization of an audio-scenario database table, including:
        configuring, for one or more audio scenarios at an information handling system, an associated audio device, each audio device associated with an audio device identification (ID) that uniquely identifies the audio device;
        generating the audio-scenario database table that indicates, for each audio scenario, an associated audio device ID of the audio device for the audio scenario;
    performing, at a second time, a steady-state monitoring of the information handling system, including:
        identifying an initialization of a particular audio scenario;
        in response to identifying the initialization of the particular audio scenario:

obtaining an image of a user of the information handling system during the initialization of the particular audio scenario;

performing image recognition of the image;

identifying, in response to the image recognition of the image, a particular audio device within the image;

comparing the audio ID of the particular audio device with the audio-scenario database table;

matching, based on the comparing, a particular audio ID of the particular audio device with the audio-scenario database table; and enabling, based on the matching, the particular audio device as the active audio device for the particular audio scenario.

9. The information handling system of claim 8, the operations further comprising:

identifying the audio scenarios, including, for each audio scenario:

identifying a computer-implemented application associated with the audio scenario;

identifying one or more processes of the computer-implemented application that is associated with the audio scenario;

identifying one or more parameters associated with the computer-implemented application and the one or more processes, the parameters including one or more of day, time, meeting type, type of the computer-implemented application, posture mode of the information handling system, hinge angle of the information handling system, and docking mode.

10. The information handling system of claim 8, the operations further comprising storing the audio-scenario database table.

11. The information handling system of claim 8, the operations further comprising:

registering for notifications regarding event status changes of the one or more audio devices with respect to the information handling system, the event status changes including coupling and/or decoupling of the one or more audio devices with respect to the information handling system.

12. The information handling system of claim 11, further comprising:

determining that the particular audio device of the image is coupled or decoupled with respect to the information handling system based on the event status changes of the particular audio device.

13. The information handling system of claim 8, the operations further comprising:

disabling, based on the matching, a different audio device for the particular audio scenario, the different audio device previously enabled with respect to the information handling system.

14. A non-transitory computer-readable medium storing software comprising instructions executable by one or more computers which, upon such execution, cause the one or more computers to perform operations comprising:

performing, at a first time, initialization of an audio-scenario database table, including:

configuring, for one or more audio scenarios at an information handling system, an associated audio device, each audio device associated with an audio device identification (ID) that uniquely identifies the audio device;

generating the audio-scenario database table that indicates, for each audio scenario, an associated audio device ID of the audio device for the audio scenario;

performing, at a second time, a steady-state monitoring of the information handling system, including:

identifying an initialization of a particular audio scenario;

in response to identifying the initialization of the particular audio scenario:

obtaining an image of a user of the information handling system during the initialization of the particular audio scenario;

performing image recognition of the image;

identifying, in response to the image recognition of the image, a particular audio device within the image;

comparing the audio ID of the particular audio device with the audio-scenario database table;

matching, based on the comparing, a particular audio ID of the particular audio device with the audio-scenario database table; and enabling, based on the matching, the particular audio device as the active audio device for the particular audio scenario.

15. The computer-readable medium of claim 14, the operations further comprising:

identifying the audio scenarios, including, for each audio scenario:

identifying a computer-implemented application associated with the audio scenario;

identifying one or more processes of the computer-implemented application that is associated with the audio scenario;

identifying one or more parameters associated with the computer-implemented application and the one or more processes, the parameters including one or more of day, time, meeting type, type of the computer-implemented application, posture mode of the information handling system, hinge angle of the information handling system, and docking mode.

16. The computer-readable medium of claim 14, the operations further comprising storing the audio-scenario database table.

17. The computer-readable medium of claim 14, the operations further comprising:

registering for notifications regarding event status changes of the one or more audio devices with respect to the information handling system, the event status changes including coupling and/or decoupling of the one or more audio devices with respect to the information handling system.

18. The computer-readable medium of claim 17, further comprising:

determining that the particular audio device of the image is coupled or decoupled with respect to the information handling system based on the event status changes of the particular audio device.

* * * * *